United States Patent [19]

Holland et al.

[11] 4,059,384
[45] Nov. 22, 1977

[54] TWO-STEP INJECTION MOLDING

[75] Inventors: Charles M. Holland, San Lorenzo; Lawrence W. Parrack, Hayward, both of Calif.

[73] Assignee: Misto$_2$Gen Equipment Co., Oakland, Calif.

[21] Appl. No.: 703,142

[22] Filed: July 7, 1976

Related U.S. Application Data

[62] Division of Ser. No. 542,332, Jan. 20, 1975, Pat. No. 3,996,329.

[51] Int. Cl.$^2$ .............................................. B29F 1/06
[52] U.S. Cl. .................................... 425/577; 425/414; 425/437
[58] Field of Search ............... 425/249, 248, 129, 422, 425/437, 414; 264/328, 296

[56] References Cited

U.S. PATENT DOCUMENTS

| | | | |
|---|---|---|---|
| 3,470,284 | 9/1969 | Hartmann | 425/422 X |
| 3,671,159 | 6/1972 | Greenberg et al. | 425/437 X |
| 3,737,272 | 6/1973 | Segmuller | 425/248 |
| 3,767,742 | 10/1973 | Robin | 264/328 X |
| 3,825,637 | 7/1974 | Robin | 264/328 X |

Primary Examiner—Richard B. Lazarus
Assistant Examiner—William R. Briggs
Attorney, Agent, or Firm—Townsend and Townsend

[57] ABSTRACT

A method and apparatus for injection molding plastic articles which have a relatively thin wall portion is disclosed. A primary core is inserted into a cavity to form the basic mold, and molten plastic is injected into the mold. A secondary core is projected partially into the mold at the section of the mold adapted to form the thin wall portion of the article before the plastic is fully cured to thin the plastic at that section. The plastic is then allowed to fully cure to form the article, and it is removed from the mold.

4 Claims, 9 Drawing Figures

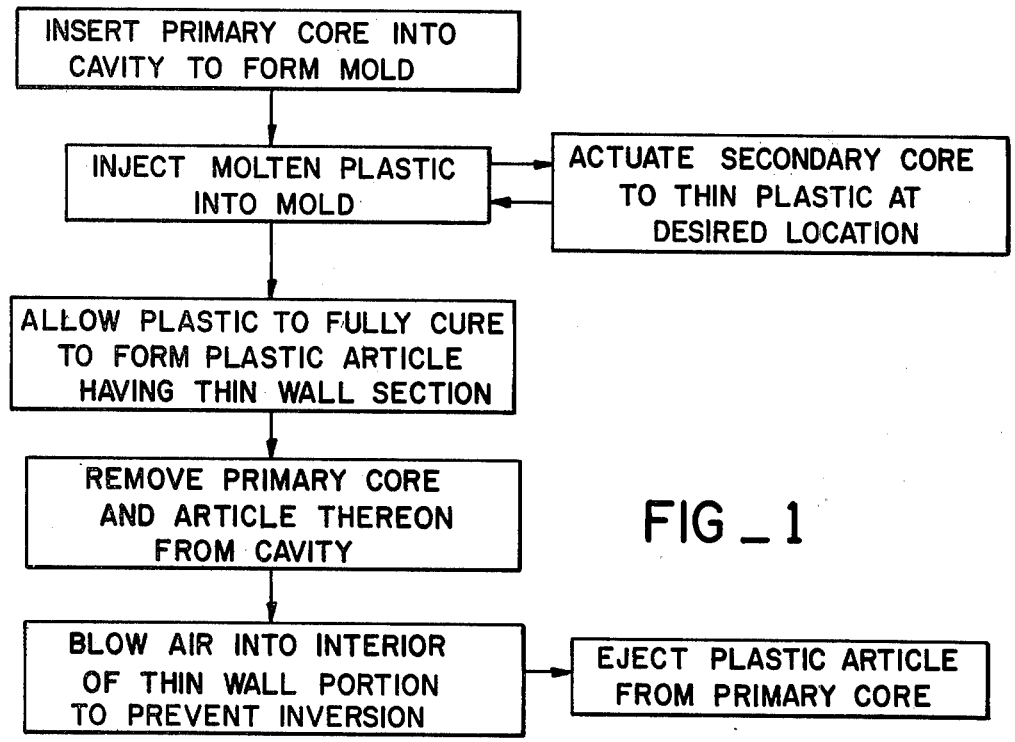
FIG_1
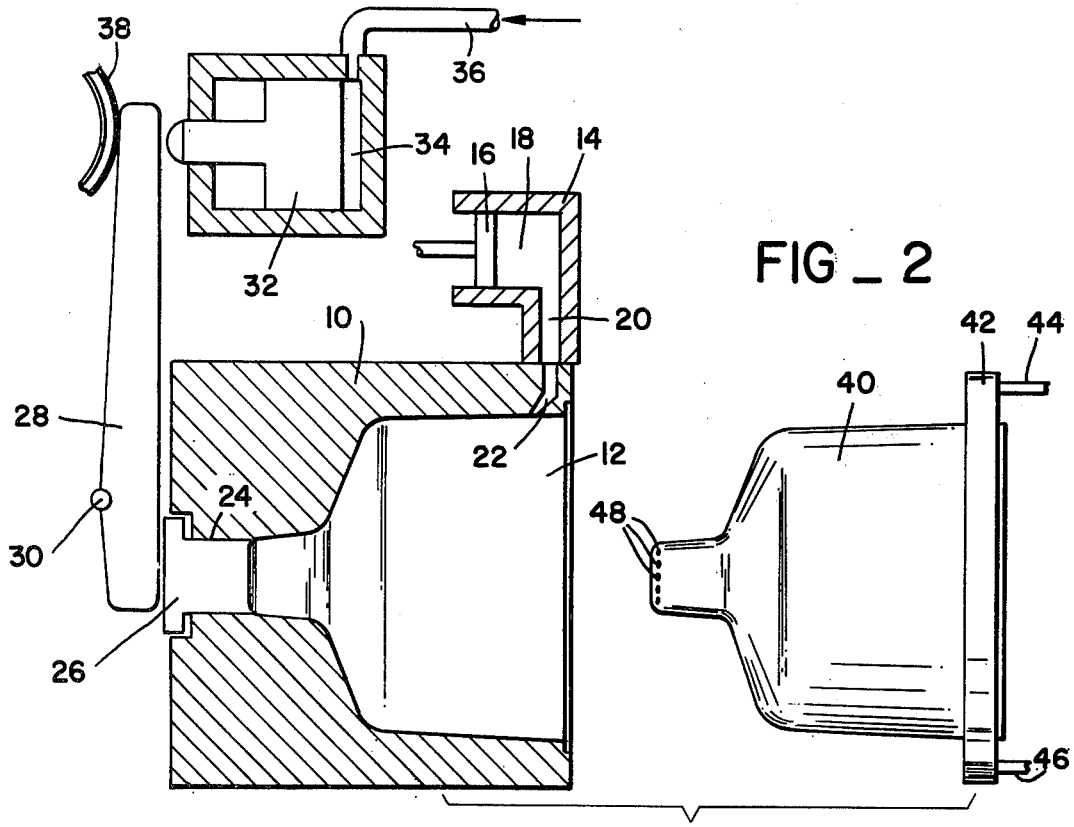
FIG_2

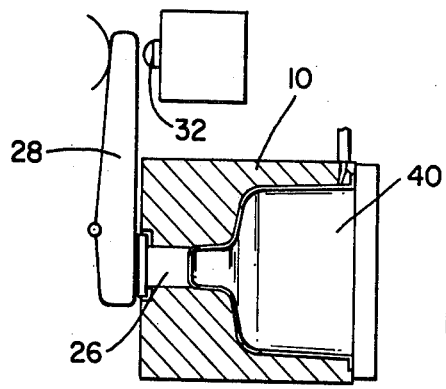
FIG_3A
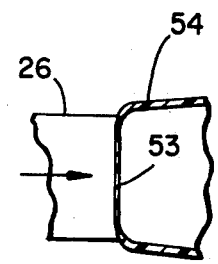
FIG_4
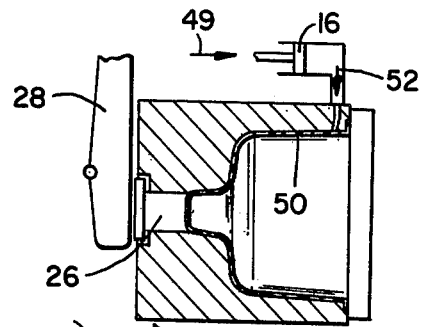
FIG_3B
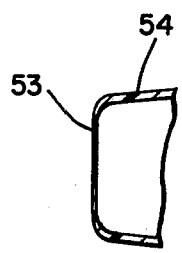
FIG_5
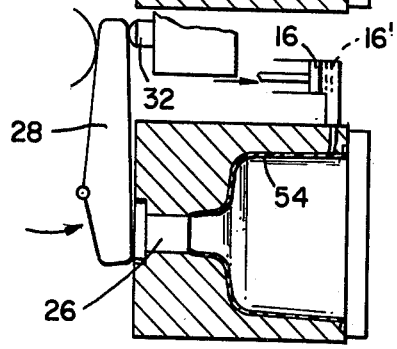
FIG_3C
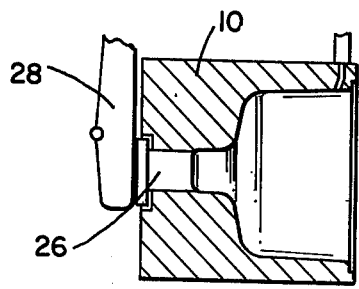
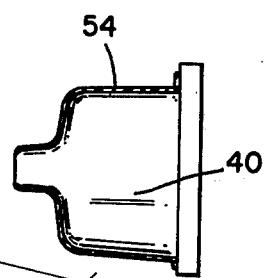
FIG_3D
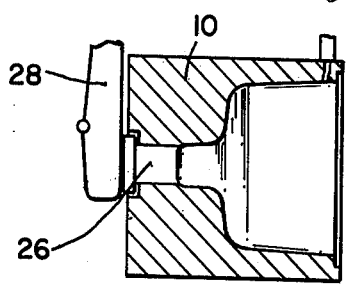
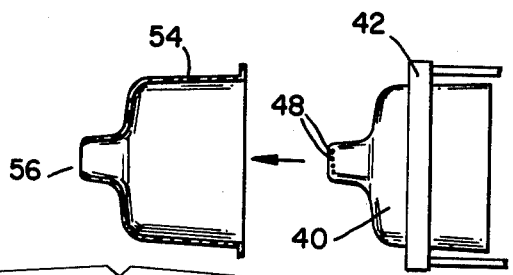
FIG_3E

TWO-STEP INJECTION MOLDING

This is a division of application Ser. No. 542,332, filed Jan. 20, 1975, now U.S. Pat. No. 3,996,329.

BACGROUND OF THE INVENTION

The present invention relates to injection molding, and in particular to two-step injection molding for forming plastic articles having wall portions relatively thinner than would be achieved with standard injection molding techniques.

Plastic articles formed by injection molding have a wide variety of uses. However, it is essential in injection molding that the injected molten plastic flow evenly throughout the entire mold to properly form the article. It has been found that such molten plastic will ordinarily not flow through a section of the mold which is less than 0.015 inch which limits the thinness of the walls of an article formed by injection molding. This limitation is often critical when it is desired to form plastic articles which have extremely thin walls or wall portions.

One example of an application wherein it is desired to form a plastic article having an extemely thin wall portion is in the plastic cups used with ultrasonic nebulizers. Ultrasonic nebulizers have been developed wherein a solution is poured into a plastic cup and ultrasonic waves are projected upwardly through the base of the cup to nebulize the solution. Such nebulizers are often used to give medicines to persons enclosed in an oxygen tent, eliminating the necessity for injecting the medicine, and are thus quite useful. However, a significant problem with such nebulizers is the p9wer loss of the ultrasonic waves as they are transmitted through the base of the cup. This power loss is directly related to the thickness of the base of the cup, and attempts have been made to make this base as thin as possible. Currently available injection molding techniques are not capable of producing plastic cups having sufficiently thin bases and the power loss of the ultrasonic waves is thus excessive.

With currently available injection molding techniques, a thin wall portion of an article is constructed simply by making the corresponding portion of the injection mold to the desired reduced thickness. As stated above, it has been found that this thickness should be no less than 0.015 inch or else the plastic will not readily flow through the thin section, and a gap may be left in the plastic article. Attempts have been made to force the plastic through thin wall sections having thicknesses no greater than 0.008 to 0.009 inch by using specialized molding techniques, and plastic cups have been made for ultrasonic nebulizers using these techniques. However, the quality of these nebulizer cups has been quite poor. The plastic must be heated to a temperature much greater than that normally used for injection molding, causing possible molecular breakdown of the plastic material and nonuniform cooling. Also, moisture in the air tends to be trapped at the thin wall portion of the mold, and condenses and is trapped in the plastic. This problem has been partially solved by adding a dehumidifier to the injection mold, but this solution to the problem is quite complex and is not fully successful. The poor quality of the cups manufactured according to these techniques results in many rejects, and the process is quite slow, greatly increasing the cost of the product. In addition, the plastic is still not as thin as desired, and large power losses still occur through the base of the cup.

SUMMARY OF THE INVENTION

The present invention provides a method for injection molding plastic articles which have a relatively thin wall portion, much thinner than that which can be obtained with normal injection molding techniques. A primary core is inserted into a cavity to form a mold, and molten plastic is injected into the mold. A secondary core is projected partially into the mold at the section of the mold adapted to form the thin wall portion of the article before the plastic is fully cured to thin the plastic at this section. The plastic is then allowed to fully cure to form the article, and it is removed from the mold.

It has been found advantageous to project the secondary core into the mold intermediate the injecting step, i.e., after it has begun but before it is completed. Specifically, while the plastic is being injected into the mold, but before the piston injecting the plastic has reached maximum compression, the secondary core is projected partially into the mold. The piston then achieves full compression to pack the molten plastic into the mold. It may also be possible to actuate the secondary core after full compression of the piston, but still before the plastic is fully cured.

It appears that the plastic articles are formed according to the teachings of the present invention in the following manner. First, some of the plastic is injected into the mold in its molten state. The molten plastic immediately adjacent the sidewalls of the mold is rapidly cooled by the sidewalls and cures first while the plastic in the interior is still molten. Thus, the molten plastic is sandwiched between layer of cured plastic. At this time, the secondary core is projected partially into the mold and squeezes the plastic which is still molten from between the cured layers at the thin portion of the article. The plastic then fully cures to form a complete article having a thin portion.

Nebulizer cups have been formed according to the method of the present invention having bases between approximately 0.003 and 0.004 inch thick. These bases are sufficiently thin so that attenuation of the ultrasonic waves through the base is minimized. The cups formed in this manner are consistently of high quality with very few rejects, and can be formed far more rapidly than cups formed according to previous methods. As a result, the ultrasonic nebulizer operates in a more efficient fashion, and the nebulizer cup can be supplied at far less cost than previously.

In the preferred embodiment of the present invention, the plastic article is removed from the mold by first withdrawing the primary core having the article thereon from the cavity, and then manually ejecting the article from the primary core. As the article is being ejected from the primary core, it has been found desirable that air be blown between the thin wall portion of the article and the primary core. If such air is not provided, the suction on the thin portion of the article as it is removed from the primary core may result in inversion of this thin portion and ruin the configuration of the article.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a sequence diagram of the steps of the present invention;

FIG. 2 is a cross sectional elevation view of the apparatus of the present invention;

FIGS. 3A, B, C, D and E are sequential schematic views illustrating the operation of the apparatus of the present invention;

FIG. 4 is a fragmentary view illustrating the actuation of the secondary core of the present invention;

FIG. 5 is a fragmentary view of the base portion of the cup shaped article formed according to the teachings of the present invention.

DESCRIPTION OF THE PREFERRED EMBODIMENT

The general sequence of the present invention is illustrated by way of reference to FIG. 1. First, a primary core is inserted into a cavity to form a mold having the configuration of the article to be formed except at the desired thin wall portion. Molten plastic is then injected into the mold. As the plastic is being injected, a secondary core is actuated to thin the plastic at the desired location. It is preferred that the secondary core be actuated before the piston injecting the plastic completes its power stroke. However, it may be possible to actuate the secondary core immediately after the piston has completed its stroke but before the plastic is completely cured and still achieve the object of the present invention. After the secondary core is actuated, the plastic is allowed to fully cure to form the plastic article having the thin wall section. The primary core is then removed from the cavity with the article remaining on the primary core. Air may be blown into the interior of the thin wall portion to prevent it from inverting as the article is ejected from the primary core.

The apparatus of the present invention used to form a cup shaped article for an ultrasonic nebulizer is illustrated by way of reference to FIG. 2. A cavity 10 is provided having a hollow interior 12 generally conformed to the exterior configuration of the cup to be formed. An injector stage 14 is connected to cavity 10, and includes a piston 16 adapted to force molten plastic from chamber 18 through riser 20, gate 22 and into the interior of the cavity. An aperture 24 is provided in cavity 10 at the position where the base of the cup shaped article is to be formed. A secondary core 26 is disposed within aperture 24. Secondary core 26 can be projected partially into the hollow interior 12 of cavity 10 by lever 28 mounted at pivot 30. Lever 28 is actuated by an hydraulic piston 32 in piston cylinder 34 by hydraulic fluid entering through line 36. After lever 28 has been actuated by piston 32, the hydraulic pressure in cylinder 34 can be released and spring 38 returns the lever to its original position.

A primary core 40 is provided having an exterior configuration conformed to the interior configuration of the cup shaped article to be formed. When primary core 40 is inserted into the hollow interior 12 of cavity 10, a mold is formed having the configuration of the article except at the thin wall portion. The width of the mold is typically approximately 0.040 inch throughout for the formation of a nebulizer cup prior to actuation of secondary core 26. When secondary core 26 is actuated, the width of the mold at the base is reduced to approximately 0.030 to 0.004 inch to minimize the thickness of the base of the article.

A ring 42 circumscribes the outer surface of primary core 40. Ring 42 is mounted independent of primary core 40 on rods 44, 46 so that the ring can slide over the outer circumference of the primary core. After a plastic article has been formed, primary core 40 is withdrawn from the mold with the plastic article thereon. Air can be blown through a plurality of small apertures 48 between the thin base of the article and the primary core as ring 42 is slid along primary core 40 to manually eject the plastic article from the primary core. The air through apertures 48 prevents inversion of the thin base caused by suction between the article and primary core.

The operation of the apparatus of the present invention in forming a plastic cup shaped article is more fully illustrated by FIGS. 3A-E in sequence. Primary core 40 is initially inserted in cavity 10 with secondary core 26 in the retracted position as illustrated in FIG. 3A. Piston 16 is then actuated as illustrated in FIG. 3B to initiate its power stroke as illustrated by arrow 49. The power stroke of piston 16 acts to force molten plastic 50 into the mold, as illustrated by arrow 52.

Before piston 16 finishes its power stroke, lever 28 is actuated by hydraulic piston 32 to project secondary core 26 partially into the mold, as illustrated in FIG. 3C. Secondary core 26 thins the mold at the base 53 of cup 54 as shown in FIG. 4 to a thickness of approximately 0.003 to 0.004 inch. With secondary core 26 in this position, piston 16 finishes its power stroke as illustrated by 16' and the plastic is allowed to fully cure to form plastic article 54.

After the plastic has fully cured, primary core 40 is withdrawn from the interior of cavity 10 and article 54 remains on the primary core, as illustrated in FIG. 3D. Air can then be blown between primary core 40 and the thin base portion 56 of article 54 so that the thin portion does not invert. Article 54 is then manually ejected from primary core 40 by sliding ring 42 forwardly over the primary core as shown in FIG. 3E. The resulting cup shaped article 54 typically has an overall thickness of approximately 0.040 inch but a thickness at the base 53 of the article is typically only 0.003 to 0.004 inch. (See FIG. 5).

While a preferred embodiment of the present invention has been illustrated in detail, it is apparent that modifications and adaptations of that embodiment will occur to those skilled in the art. For example, the present invention could be used for forming plastic articles other than nebulizer cups where it is desirable that thin wall portions form a part of the article. However, it is to be expressly understood that such modifications and adaptations are within the spirit and scope of the present invention, as set forth in the following claims.

I calim:

1. Apparatus for forming plastic articles having relatively thin wall portions, said apparatus comprising:
    a cavity having an interior configuration generally conformed to the exterior of the plastic article to be formed, said cavity having an aperture adjacent the portion of the cavity adapted to form the thin portion of the article;

a primary core having an exterior configuration conformed to the interior configuration of the plastic article;

means operable to insert the primary core into the cavity to form a mold;

means operable to inject molten plastic into the mold;

a secondary core located in the aperture in the cavity; and means operable to project the secondary core partially into the mold as molten plastic is injected into the mold to thin the plastic adjacent the secondary core, said secondary core being fully projected into the mold prior to the termination of said injecting so that the molten plastic is compressed into the mold, the projected secondary core and the primary core defining a space therebetween that is no greater than approximately 0.005 inch.

2. Apparatus as recited in claim 1 and additionally comprising means for blowing air between the thin wall portion of the article and the primary core, and means for manually ejecting the plastic article from the mold as the air is blown to prevent inversion of the thin wall portion during said ejection.

3. Apparatus as recited in claim 1 wherein said injecting means includes a piston having a power stroke to inject molten plastic into the mold, and wherein said secondary core is projected partially into the mold after the piston has initiated its power stroke but before the termination of said power stroke.

4. Apparatus for forming plastic cup shaped articles having relatively thin base wall portions, said apparatus comprising:

a cavity having an interior configuration generally conformed to the exterior of the article to be formed, said cavity having an aperture adjacent the portion of the cavity adapted to form the thin base portion of the article;

a primary core having an exterior configuration conformed to the interior of the article to be formed, said primary core including means for blowing air at the portion of the primary core adapted to form the thin base portion of the article;

means operable to insert the primary core into the cavity to form a mold;

a piston having a power stroke adapted to inject molten plastic into the mold;

a secondary core located in the aperture in the cavity;

a lever adapted to be actuated to project the secondary core partially into the mold; and an hydraulic piston adapted to actuate the lever to project the secondary core partially into the mold intermediate the power stroke of the piston to thin the plastic adjacent the secondary core, the molten plastic being compressed into the mold by the continuation of the power stroke of the piston after projection of the secondary core, the projected secondary core and the primary core defining a space therebetween that is no greater than approximately 0.005 inch.

* * * * *